US012755584B2

(12) United States Patent
Sodha et al.

(10) Patent No.: US 12,755,584 B2
(45) Date of Patent: Oct. 6, 2026

(54) SYSTEM AND METHOD FOR CROSS-VEHICLE DATA COLLECTION ABSTRACTION

(71) Applicant: FCA US LLC, Auburn Hills, MI (US)

(72) Inventors: Raghuvirsinh Sodha, Auburn Hills, MI (US); Andrew Hoin, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 82 days.

(21) Appl. No.: 18/821,289

(22) Filed: Aug. 30, 2024

(65) Prior Publication Data

US 2026/0065720 A1 Mar. 5, 2026

(51) Int. Cl.

| | |
|---|---|
| ***G07C 5/00*** | (2006.01) |
| ***B60W 50/04*** | (2006.01) |
| ***H04L 67/12*** | (2022.01) |
| ***H04W 4/44*** | (2018.01) |

(52) U.S. Cl.

CPC ........... *G07C 5/008* (2013.01); *B60W 50/045* (2013.01); *H04L 67/12* (2013.01); *H04W 4/44* (2018.02); *B60W 2050/046* (2013.01)

(58) Field of Classification Search

CPC ...... G07C 5/008; H04W 4/44; B60W 50/045; B60W 2050/046; H04L 67/12

See application file for complete search history.

(56) References Cited

U.S. PATENT DOCUMENTS

| | | | | |
|---|---|---|---|---|
| 11,316,928 | B2 | 4/2022 | Campbell | |
| 11,721,137 | B2 * | 8/2023 | Fang | G07C 5/008 701/31.5 |
| 12,046,085 | B2 | 7/2024 | Fang et al. | |
| 2016/0223813 | A1 * | 8/2016 | Feldman | B60R 11/0235 |
| 2017/0161973 | A1 * | 6/2017 | Katta | G07C 5/085 |
| 2018/0257560 | A1 * | 9/2018 | Kapuria | B60Q 9/00 |
| 2019/0034256 | A1 * | 1/2019 | Fox | B60W 50/02 |
| 2020/0336541 | A1 | 10/2020 | Naderi Alizadeh et al. | |
| 2022/0343699 | A1 | 10/2022 | Schmid et al. | |
| 2024/0364784 | A1 * | 10/2024 | Gehrmann | H04L 12/40 |

FOREIGN PATENT DOCUMENTS

| | | | |
|---|---|---|---|
| CN | 109523413 | A | 3/2019 |

* cited by examiner

*Primary Examiner* — Truc M Do
(74) *Attorney, Agent, or Firm* — Jeremy J. Klobucar

(57) ABSTRACT

A dynamic and conditional data collection method for vehicle includes generating, by a cloud-based system, a software policy for a software code, the software policy including at least one of (i) a Check feature and (ii) a Select feature, wherein the Check feature specifies a runtime condition whose state determines whether a first set of vehicle parameters or a different second set of vehicle parameters are to be collected and the Select feature specifies a particular variable whose value, relative to a range of variable values, determines whether a third set of vehicle parameters or a different fourth set of vehicle parameters are to be collected, and providing the software policy to the ECU for execution of the software code according to the software policy to dynamically and conditionally collect vehicle data, which can be returned from the ECU to the cloud-based system for further analysis.

20 Claims, 3 Drawing Sheets

SYSTEM AND METHOD FOR CROSS-VEHICLE DATA COLLECTION ABSTRACTION

FIELD

The present application generally relates to vehicle data collection and, more particularly, to a system and method for cross-vehicle data collection abstraction.

BACKGROUND

Today's vehicles include a plurality of electronic control units (ECUs) each being configured to execute software code (also referred to as "an application") that can involve the collection of vehicle data. A software policy for the software code defines configuration parameters or an environment for the execution of the software code. Vehicle software policies have become extremely large, complex, and repetitive when trying to implement conditional data collection. This is due to the conventional process of creating multiple policies that are nearly identical except for slight differences in the data elements collected, potentially due to electrical architecture. For example, two policies could be entirely redundant except for a change in just one or two data elements. All of the duplicated information across the policies makes them very confusing, hard to maintain, and unintuitive, and can quickly become unmanageable. Accordingly, while such conventional solutions do work for their intended purpose, there exists an opportunity for improvement in the relevant art.

SUMMARY

According to one example aspect of the invention, a dynamic and conditional data collection system for vehicle is presented. In one exemplary implementation, the system comprises a cloud-based system configured to generate a software policy for a software code, the software policy including at least one of (i) a Check feature and (ii) a Select feature, wherein the Check feature specifies a runtime condition whose state determines whether a first set of vehicle parameters or a different second set of vehicle parameters are to be collected, and wherein the Select feature specifies a particular variable whose value, relative to a range of variable values, determines whether a third set of vehicle parameters or a different fourth set of vehicle parameters are to be collected, and an ECU of the vehicle that is configured to receive the software policy from the cloud-based system, execute the software code according to the software policy and its Check and/or Select features, which causes the ECU to collect a specific set of vehicle parameters including at least one of the first, second, third, and fourth sets of vehicle parameters, and output the collected specific set of vehicle parameters.

In some implementations, the collected specific set of vehicle parameters are output from the ECU to the cloud-based network. In some implementations, the Select feature further specifies a different fifth set of vehicle parameters that are to be collected when there is no match between the particular variable value and the range of variable values. In some implementations, the software policy is a single software policy and not multiple, mostly redundant policies. In some implementations, the software policy includes both (i) the Check feature and (ii) the Select feature.

In some implementations, the collected specific set of vehicle parameters includes (i) one of the first and second sets of vehicle parameters and (ii) one of the third and fourth sets of vehicle parameters. In some implementations, the collected specific set of vehicle parameters includes the one of the third and fourth sets of vehicle parameters or, when there is no match between the particular variable value and the range of variable values, a different fifth set of vehicle parameters. In some implementations, a variable type for the particular variable and the range of variable values is a numerical variable. In some implementations, a variable type for the particular variable and the range of variable values is a string variable.

According to another example aspect of the invention, a dynamic and conditional data collection method for vehicle is presented In one exemplary implementation, the method comprises generating, by a cloud-based system, a software policy for a software code, the software policy including at least one of (i) a Check feature and (ii) a Select feature, wherein the Check feature specifies a runtime condition whose state determines whether a first set of vehicle parameters or a different second set of vehicle parameters are to be collected, and the Select feature specifies a particular variable whose value, relative to a range of variable values, determines whether a third set of vehicle parameters or a different fourth set of vehicle parameters are to be collected, receiving, by an electronic control unit (ECU) of the vehicle, the software policy from the cloud-based system, executing, by the ECU, the software code according to the software policy and its Check and/or Select features, which causes the ECU to collect a specific set of vehicle parameters including at least one of the first, second, third, and fourth sets of vehicle parameters, and outputting, by the ECU, the collected specific set of vehicle parameters.

In some implementations, the collected specific set of vehicle parameters are output from the ECU to the cloud-based network. In some implementations, the Select feature further specifies a different fifth set of vehicle parameters that are to be collected when there is no match between the particular variable value and the range of variable values. In some implementations, the software policy is a single software policy and not multiple, mostly redundant policies. In some implementations, the software policy includes both (i) the Check feature and (ii) the Select feature.

In some implementations, the collected specific set of vehicle parameters includes (i) one of the first and second sets of vehicle parameters and (ii) one of the third and fourth sets of vehicle parameters. In some implementations, the collected specific set of vehicle parameters includes the one of the third and fourth sets of vehicle parameters or, when there is no match between the particular variable value and the range of variable values, a different fifth set of vehicle parameters. In some implementations, a variable type for the particular variable and the range of variable values is a numerical variable. In some implementations, a variable type for the particular variable and the range of variable values is a string variable.

According to yet another example aspect of the invention, a dynamic and conditional data collection method for vehicle is presented. In one exemplary implementation, the method comprises generating, by a cloud-based system, a software policy for a software code, the software policy including (i) a Check feature and (ii) a Select feature, wherein the Check feature specifies a runtime condition whose state determines whether a first set of vehicle parameters or a different second set of vehicle parameters are to be collected, and the Select feature specifies a particular variable whose value, relative to a range of variable values, determines whether a third set of vehicle parameters or a different fourth set of vehicle parameters are to be collected, receiving, by an ECU of the vehicle, the software policy from the cloud-based system, executing, by the ECU, the software code according to the software policy and its Check and/or Select features, which causes the ECU to collect a specific set of vehicle parameters including (i) one of the first and second sets of vehicle parameters and (ii) one of the third and fourth sets of vehicle parameters, and outputting, by the ECU, the collected specific set of vehicle parameters.

In some implementations, the Select feature further specifies a different fifth set of vehicle parameters that are to be collected when there is no match between the particular variable value and the range of variable values, and wherein the collected specific set of vehicle parameters includes (i) the one of the first and second sets of vehicle parameters and (ii) one of the third, fourth, and fifth sets of vehicle parameters.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, today's vehicle software policies have become extremely large, complex, and repetitive when trying to implement conditional data collection. This is due to the conventional process of creating multiple policies that are nearly identical except for slight differences in the data elements collected. For example, two policies could be entirely redundant except for a change in just one or two data elements. Filters could be used to control execution based on conditions, but there is no way to dynamically adapt what data was collected by a policy at runtime. The main drawback of this previous approach was that it leads to policies that are extremely repetitive, hard to understand, and do not follow good design practices. Over time, this conventional approach could result in a vehicle software policy platform that is unmanageable.

By having multiple nearly identical software policies with only slight differences, the policies become bloated and confusing. This also makes the policies very brittle to maintain, since any change would need to be propagated across all the duplicate policies. From a user experience standpoint, the policies are unintuitive to interpret and lack clear structure. It becomes hard to discern the logic flow and conditions that determined which data was collected. Debugging or modifying these policies becomes very cumbersome and error-prone due to all the duplication. Finally, the workflows for policy creation are also inefficient, as developers have to manually create these complex conditional structures. This slows down development and makes it hard to adapt quickly to new business requirements. Thus, an opportunity for improvement exists in the relevant art.

Accordingly, a dynamic and conditional data collection system and method for a vehicle are presented herein. This includes new "Check" and "Select" features that enable dynamic and conditional data collection within vehicle software policies. The Check feature provides an if-then logic construct that allows different data elements to be collected based on runtime conditions (e.g., different data collection statements for true and false conditions). The Select feature allows cases to be defined with different data elements to collect based on the value of a variable (numeric variables, string variables, etc.), such as its value relative to a range. A default case can also be defined as a final catch-all option. These techniques enable fully configurable conditional logic within a single policy and eliminates the above-described bloated and redundant vehicle software policies.

Figure 1A:
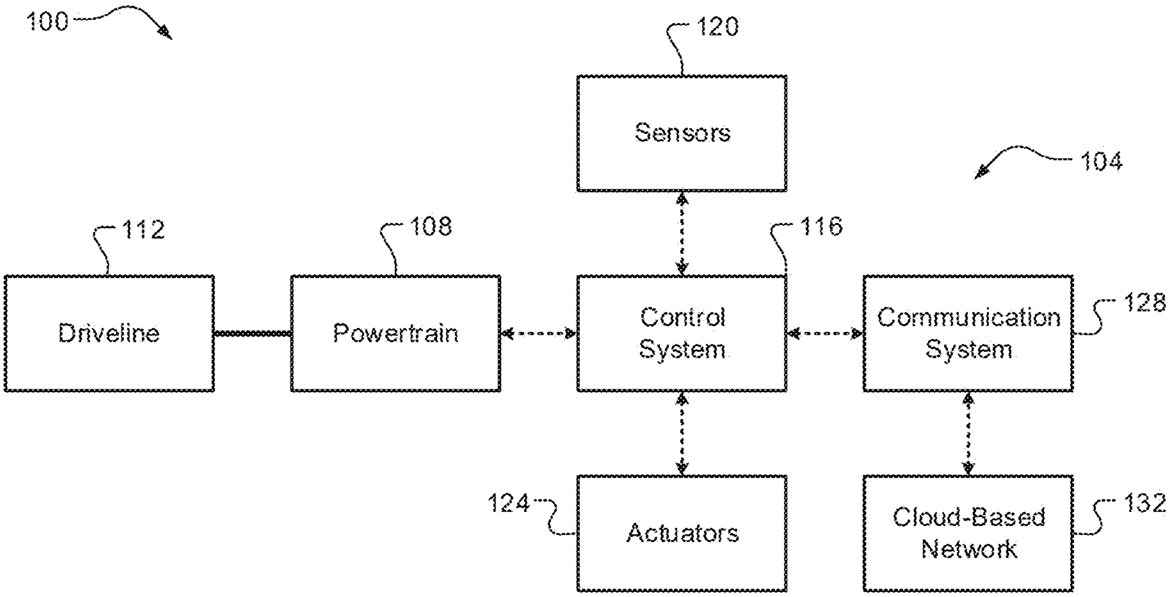
FIGS. 1A-1B are functional block diagrams depicting an example vehicle and an example dynamic and conditional data collection system according to the principles of the present application.
Figure 1B:
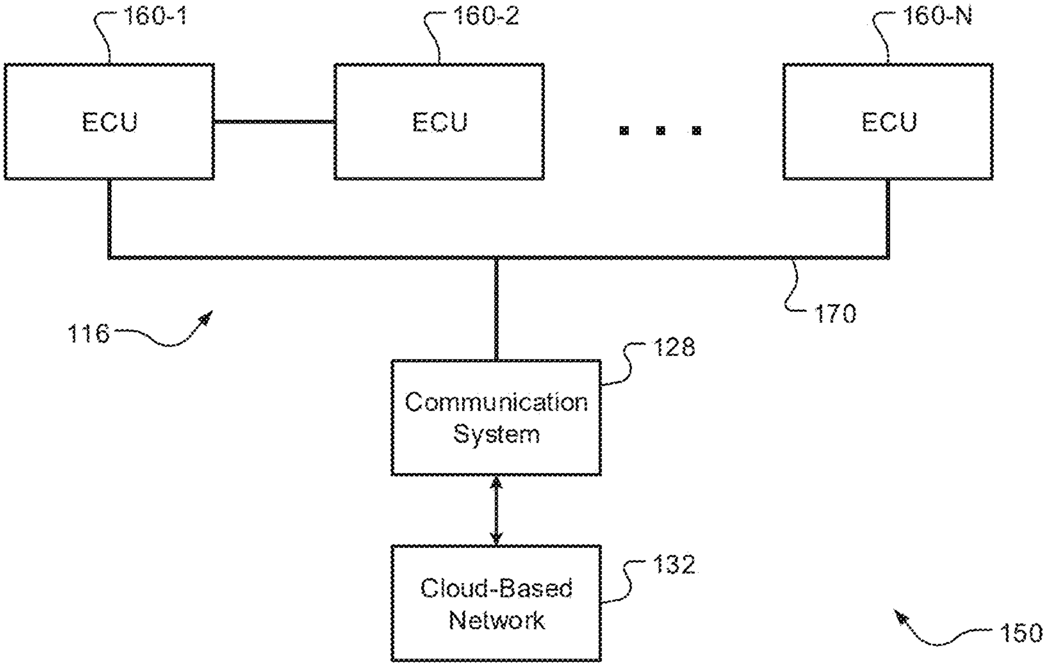

Referring now to FIGS. 1A-1B, functional block diagrams depicting an example vehicle 100 having a live software policy management system 104 and an example configuration 150 of the live software policy management system 104 are illustrated. The vehicle 100 could have any suitable configuration but, for illustrative/descriptive purposes, the vehicle 100 is shown to generally include a powertrain 108 configured to generate and transfer torque to a driveline 112 for propulsion. Non-limiting examples of the components of the powertrain 108 include an engine, an electric motor, a transmission, and combinations thereof. Non-limiting examples of the components of the driveline 112 include axles or half-shafts, differentials, and wheels. A control system 116 is configured to control operation of the vehicle 100.

Specifically, the control system 116 is configured to receive measurements from a plurality of sensors 120 and to control a plurality of actuators or other vehicle systems 124. For example only, the control system 116 could receive a driver torque request via a driver interface or sensor (e.g., an accelerator pedal) and then control the powertrain 108 to generate an amount of drive torque to satisfy the driver torque request. The control system 116 is also configured to communicate with external computing systems via a communication system 128 (e.g., a transceiver) and a network (e.g., a cellular or satellite data network). One such remote system is a cloud-based network 132, which could be one or more OEM computing servers and, in some cases, one or more authenticated software/application developer computing devices.

In one exemplary configuration 150, the control system 116 comprises a plurality of controllers or ECUs 160-1 . . . 160-N (N being an integer greater than one; collectively, "ECUs") configured to communicate with each other via a CAN 170 comprising one or more CAN buses. For example, the CAN 170 could include a plurality of different CAN buses and each CAN bus could be configured to broadcast a certain set of ECU signals. Non-limiting examples of the ECUs 160 include a supervisory or primary ECU (e.g., a vehicle control unit, or VCU) and subsidiary or secondary ECUs (an engine control unit, or ECU, a motor control unit, or MCU, a transmission control unit, or TCU, etc.). Based on their respective software policies, the ECUs 160 collect data (e.g., ECU signals), which could then be reported back to the cloud-based network 132.

Figure 2:
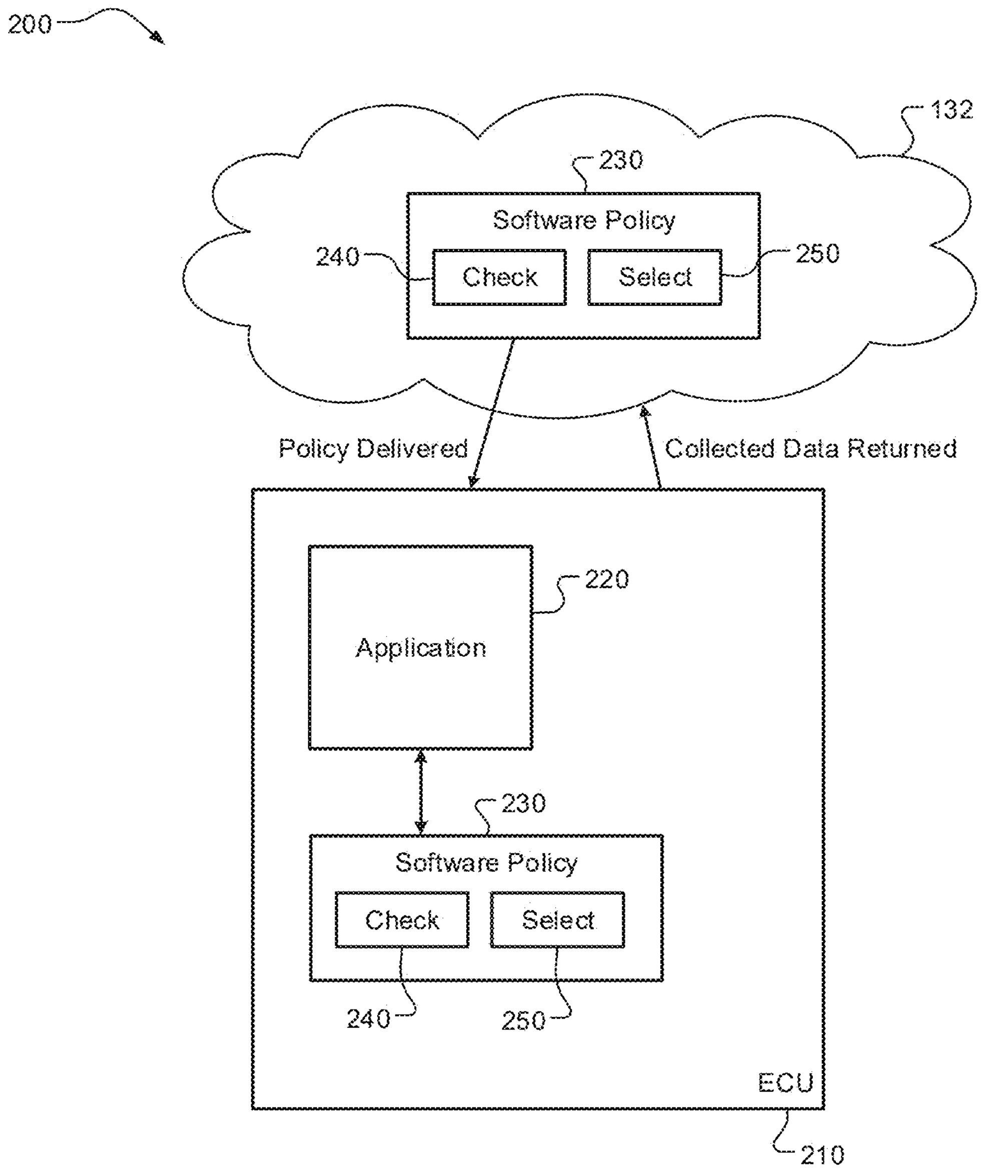
FIG. 2 is functional block diagrams depicting an example operation of the dynamic and conditional data collection system according to the principles of the present application.

Referring now to FIG. 2 and with continued reference to FIGS. 1A-1B, functional block diagrams depicting an example operation 200 of the dynamic and conditional data collection system 104 according to the principles of the present application are illustrated. The vehicle 100 and its related components (e.g., the cloud-based network 132) are specifically referenced for descriptive/illustrative purposes. As shown, an ECU 210 (e.g., one of the ECUs 160 of vehicle 100) is configured to communicate with the cloud-based system 132, such as via one or more communication networks (a cellular data network, a satellite data network, etc.). As mentioned, the cloud-based network 132 could be associated with an OEM of the vehicle 100 and could include, for example only, an OEM computing device/server or an authenticated computing device.

The ECU 210 is configured to receive and execute a software code 220 (also referred to as "application 220") according to a software policy. The software code 220 could be provided, for example, to the ECU 210 from an automotive software engineer (e.g., via the cloud-based network 132). The particular software policy for execution of the software code 220 could be one of a plurality of different software policies. As shown, the ECU 210 also receives and stores a software policy 230. Similar to the software code 220, the software policy 230 could be provided, for example, to the ECU 210 from the automotive software engineer (e.g., via the cloud-based network 132). While only a single software policy 230 is specifically discussed below, it will be appreciated that the ECU 210 could store multiple different software policies for the software code 220.

As shown, the software policy 230 includes at least one of (i) a Check feature 240 and (ii) a Select feature 250. These features 240 and/or 350 are configurable conditional logic that is native within the software policy 230, thereby eliminating the need to multiple redundant policies as discussed above. The Check feature 240 provides an intuitive way to define if-then logic that adapts data collection on the fly based on runtime conditions. All condition checks and branching logic can be handled in the single software policy 230. For example, the Check feature 240 could include the following example if-then condition statement: "If runtime condition A=1, then collect data X; If runtime condition A=0, then collect data Y." Thus, depending on whether runtime condition A is true or false, different data (X or Y) could be collected by the software code 220. In some implementations, the dynamic and conditionally collected data could be returned to the cloud-based network 132 (e.g., for further analysis).

The Select feature 250, on the other hand, allows switches on different data elements based on variable values in a very simple way. That is, the Select feature 250 allows cases to be defined with different data elements to collect based on the value of a variable. Ranges can be specified for numeric values and strings defined for string variables. The variable value is checked against the defined cases and the corresponding data collection statement is executed based on the case matched. In some implementations, a default case can also be defined as a final catch-all option (e.g., when a match is not found). All of this can be encapsulated in the single software policy 230, thus enabling fully configurable conditional logic within the single software policy 230 and eliminating the need for duplication across multiple policies.

Together, the Check feature 240 and the Select feature 250 enable policies that are much smaller, simpler, and easier to understand (i.e., clean and modular constructs within the policies). They also enable much more flexible and dynamic data collection that can be adapted on the fly based on real-time sensor values (e.g., sensors 120) or back-end services. These new workflows make policy design more efficient and modular. The main difference compared to the conventional solutions is that complex, conditional logic can now be embedded natively within software policies, rather than requiring multiple duplicate policies. This enables dynamic data collection that can adapt in real-time based on vehicle state and conditions. The new policies are easier to interpret, debug and maintain without all the redundancy. They also promote modular and reusable policy components versus monolithic blocks of logic.

Figure 3:
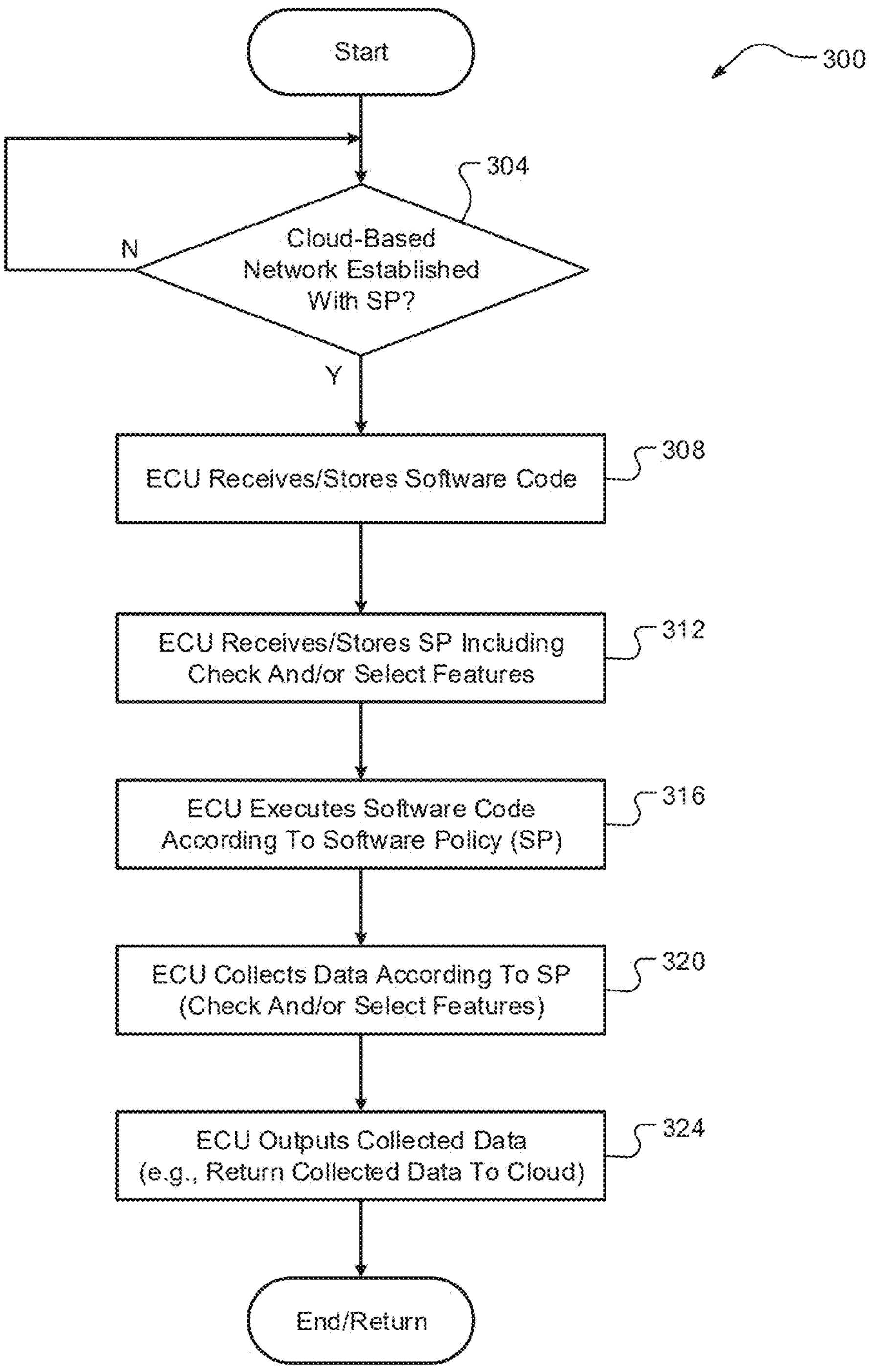
FIG. 3 is a flow diagram depicting an example dynamic and conditional data collection method for a vehicle according to the principles of the present application.

Referring now to FIG. 3 and with continued reference to the previous figures, a flow diagram depicting an example dynamic and conditional data collection method 300 for a vehicle according to the principles of the present application is illustrated. While the method 300 specifically references the previous figures (FIGS. 1A-1B and 2) and the previously discussed components (e.g., vehicle 100), it will be appreciated that the method 300 could be applicable to any suitable vehicle and CAN network implementations. The method 300 begins at 304 where the cloud-based network 132 is established and the software policy (SP) 230 is generated, such as based on input from an automotive software engineer (e.g., associated with an OEM of the vehicle 100). When false, the method 300 ends or returns to 304 until the SP 230 with the Check feature 240 and/or the Select feature 250 has been generated at the cloud-based network 132. When true, the method 300 proceeds to 308. At 308, the ECU 210 receives and stores the software code 220. It will be appreciated that this step 308 could have already occurred at an earlier time.

At 312, the ECU 210 receives and stores the software policy 230. At 316, the ECU 210 executes the software code or application 220 according to the software policy 230 (i.e., the configuration parameters or environment, including the Check feature 240 and/or the Select feature 250). At 320, the ECU 210 collects data (e.g., vehicle parameters) during the execution of the software code 220 and according to the Check feature 240 and/or the Select feature 250. This could include, for example, collecting different sets of data (first vs. second, third vs. fourth, etc.) based on whether certain runtime conditions are true/false and whether there are variable matches relative to a specific range of variables. In some cases, when there is no match in the Select feature 250, a default data collection (e.g., a fifth set of data or vehicle parameters) could be collected. At 324, the ECU 210 outputs the collected data, such as returning the collected data to the cloud-based network 132 for further analysis. The method 300 then ends or returns to 304 for one or more additional cycles.

In summary, the Check and Select features encapsulate all the conditional logic cleanly in modular constructs within a policy. This results in dramatically simpler and smaller policies compared to before. The new workflows for policy creation are much more efficient and flexible. Conditional data collection can now be set up with Check and Select configurations rather than manual plan duplication. Policies can adapt much more quickly to changing business requirements thanks to the simplicity and composability enabled by Check and Select constructs. Overall, the Check and Select features radically improve the developer experience and policy outcomes compared to previous approaches. Conditional logic is cleanly captured in simple constructs that lead to streamlined and intuitive policies. This invention enables dynamic data collection that can adapt in real-time as the vehicle state changes.

It will be appreciated that the terms "controller" and "control system" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A dynamic and conditional data collection system for vehicle, the system comprising:
- a cloud-based system comprising one or more servers controlled and operated by an original equipment manufacturer (OEM) of the vehicle and configured to:
  - generate a software policy for a software code, the software policy being separate from the software code and including at least one of (i) a Check feature and (ii) a Select feature, wherein the software policy is a single software policy and not multiple software policies that are at least partially redundant,
  - wherein the Check feature specifies an if-then runtime condition at the vehicle whose state determines whether a first set of vehicle parameters or a different second set of vehicle parameters are to be collected by the vehicle, and
  - wherein the Select feature specifies a particular variable whose value, relative to first and second ranges of variable values, determines whether a third set of vehicle parameters or a different fourth set of vehicle parameters or a different and default fifth set of vehicle parameters are to be collected by the vehicle; and
- an electronic control unit (ECU) of the vehicle that is configured to:
  - receive the software policy from the cloud-based system;
  - execute, during operation of the vehicle, the software code according to the software policy and its Check and/or Select features, which causes the ECU to collect a specific set of vehicle parameters including at least one of the first, second, third, fourth, and fifth sets of vehicle parameters; and
  - output the collected specific set of vehicle parameters.

2. The system of claim 1, wherein the collected specific set of vehicle parameters are output from the ECU to the cloud-based network.

3. The system of claim 1, wherein the Select feature further specifies that the fifth set of vehicle parameters are to be collected when there is no match between the particular variable value and the range of variable values.

4. The system of claim 1, wherein the software policy includes both (i) the Check feature and (ii) the Select feature.

5. The system of claim 4, wherein the collected specific set of vehicle parameters includes (i) one of the first and second sets of vehicle parameters and (ii) one of the third, fourth, and fifth sets of vehicle parameters.

6. The system of claim 5, wherein the collected specific set of vehicle parameters includes the one of the third and fourth sets of vehicle parameters or, when there is no match between the particular variable value and the first and second ranges of variable values, the fifth set of vehicle parameters.

7. The system of claim 1, wherein a variable type for the particular variable and the first and second ranges of variable values are each a numerical variable.

8. The system of claim 1, wherein a variable type for the particular variable and the first and second ranges of variable values are each a string variable.

9. A dynamic and conditional data collection method for vehicle, the method comprising:
- generating, by a cloud-based system comprising one or more servers controlled and operated by an original equipment manufacturer (OEM) of the vehicle, a software policy for a software code, the software policy being separate from the software code and including at least one of (i) a Check feature and (ii) a Select feature, wherein the software policy is a single software policy and not multiple software policies that are at least partially redundant, wherein:
  - the Check feature specifies an if-then runtime condition at the vehicle whose state determines whether a first set of vehicle parameters or a different second set of vehicle parameters are to be collected by the vehicle, and
  - the Select feature specifies a particular variable whose value, relative to first and second ranges of variable values, determines whether a third set of vehicle parameters or a different fourth set of vehicle parameters or a different and default fifth set of vehicle parameters are to be collected by the vehicle;
- receiving, by an electronic control unit (ECU) of the vehicle, the software policy from the cloud-based system;
- executing, by the ECU and during operation of the vehicle, the software code according to the software policy and its Check and/or Select features, which causes the ECU to collect a specific set of vehicle parameters including at least one of the first, second, third, fourth, and fifth sets of vehicle parameters; and
- outputting, by the ECU, the collected specific set of vehicle parameters.

10. The method of claim 9, wherein the collected specific set of vehicle parameters are output from the ECU to the cloud-based network.

11. The method of claim 9, wherein the Select feature further specifies that the fifth set of vehicle parameters are to be collected when there is no match between the particular variable value and the range of variable values.

12. The method of claim 9, wherein the software policy includes both (i) the Check feature and (ii) the Select feature.

13. The method of claim 12, wherein the collected specific set of vehicle parameters includes (i) one of the first and second sets of vehicle parameters and (ii) one of the third, fourth, and fifth sets of vehicle parameters.

14. The method of claim 13, wherein the collected specific set of vehicle parameters includes the one of the third and fourth sets of vehicle parameters or, when there is no match between the particular variable value and the ranges of variable values, the fifth set of vehicle parameters.

15. The method of claim 9, wherein a variable type for the particular variable and the first and second ranges of variable values are each a numerical variable.

16. The method of claim 9, wherein a variable type for the particular variable and the first and second ranges of variable values are each a string variable.

17. A dynamic and conditional data collection method for vehicle, the method comprising:

generating, by a cloud-based system comprising one or more servers controlled and operated by an original equipment manufacturer (OEM) of the vehicle, a software policy for a software code, the software policy being separate from the software code and including at least one of (i) a Check feature and (ii) a Select feature, wherein the software policy is a single software policy and not multiple software policies that are at least partially redundant, wherein:

the Check feature specifies an if-then runtime condition at the vehicle whose state determines whether a first set of vehicle parameters or a different second set of vehicle parameters are to be collected by the vehicle, and the Select feature specifies a particular variable whose value, relative to first and second ranges of variable values, determines whether a third set of vehicle parameters or a different fourth set of vehicle parameters or a different and default fifth set of vehicle parameters are to be collected by the vehicle;

receiving, by an electronic control unit (ECU) of the vehicle, the software policy from the cloud-based system;

executing, by the ECU and during operation of the vehicle, the software code according to the software policy and its Check and/or Select features, which causes the ECU to collect a specific set of vehicle parameters including (i) one of the first and second sets of vehicle parameters and (ii) one of the third, fourth, and fifth sets of vehicle parameters; and outputting, by the ECU, the collected specific set of vehicle parameters.

18. The method of claim 17, wherein the Select feature further specifies that the fifth set of vehicle parameters are to be collected when there is no match between the particular variable value and the range of variable values, wherein the collected specific set of vehicle parameters includes (i) the one of the first and second sets of vehicle parameters and (ii) one of the third, fourth, and fifth sets of vehicle parameters, and wherein the first, second, third, fourth, and fifth sets of vehicle parameters each include vehicle operating parameters indicative of and collected during operation of the vehicle.

19. The system of claim 1, wherein the first, second, third, fourth, and fifth sets of vehicle parameters each include vehicle operating parameters indicative of and collected during operation of the vehicle.

20. The method of claim 9, wherein the first, second, third, fourth, and fifth sets of vehicle parameters each include vehicle operating parameters indicative of and collected during operation of the vehicle.

* * * * *